United States Patent
Yao et al.

(10) Patent No.: US 7,408,745 B2
(45) Date of Patent: Aug. 5, 2008

(54) SWAY-TYPE MICRO-ACTUATOR WITH SLIDER HOLDING ARMS FOR A DISK DRIVE HEAD GIMBAL ASSEMBLY

(75) Inventors: MingGao Yao, DongGuan (CN);
Masashi Shiraishi, HongKong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 346 days.

(21) Appl. No.: 11/125,248

(22) Filed: May 10, 2005

(65) Prior Publication Data

US 2006/0256479 A1 Nov. 16, 2006

(51) Int. Cl.
*G11B 5/596* (2006.01)
*G11B 5/48* (2006.01)

(52) U.S. Cl. .............. 360/294.4; 360/245; 360/245.3; 360/294.6

(58) Field of Classification Search .............. 360/294.4, 360/294.6, 245, 245.3
See application file for complete search history.

(56) References Cited

U.S. PATENT DOCUMENTS

| | | | |
|---|---|---|---|
| 5,299,081 A | 3/1994 | Hatch et al. | |
| 5,611,707 A | 3/1997 | Meynier | |
| 5,636,089 A | 6/1997 | Jurgenson et al. | |
| 5,898,544 A | 4/1999 | Krinke et al. | |
| 6,198,606 B1 | 3/2001 | Boutaghou et al. | |
| 6,233,124 B1* | 5/2001 | Budde et al. ............. | 360/294.4 |
| 6,268,983 B1* | 7/2001 | Imada et al. ............. | 360/294.4 |
| 6,515,834 B1* | 2/2003 | Murphy .................... | 360/294.4 |
| 6,538,836 B1 | 3/2003 | Dunfield et al. | |
| 6,617,763 B2 | 9/2003 | Mita et al. | |
| 6,624,984 B2 | 9/2003 | Lewis et al. | |
| 6,671,131 B2 | 12/2003 | Kasajima et al. | |
| 6,700,727 B1 | 3/2004 | Crane et al. | |
| 6,700,749 B2 | 3/2004 | Shiraishi et al. | |
| 6,791,783 B2* | 9/2004 | Nakagawa ............... | 360/294.4 |
| 6,950,266 B1 | 9/2005 | McCaslin et al. | |
| 2003/0099058 A1* | 5/2003 | Ishikawa et al. .............. | 360/75 |
| 2003/0137777 A1* | 7/2003 | Boutaghou et al. ........ | 360/294.4 |
| 2003/0147177 A1 | 8/2003 | Yao et al. | |
| 2003/0147181 A1 | 8/2003 | Shiraishi et al. | |

(Continued)

FOREIGN PATENT DOCUMENTS

JP 2002-74871 3/2002

(Continued)

OTHER PUBLICATIONS

U.S. Appl. No. 11/238,998, filed Sep. 2005, Yang et al.

(Continued)

*Primary Examiner*—Craig A Renner
(74) *Attorney, Agent, or Firm*—Nixon & Vanderhye P.C.

(57) ABSTRACT

A micro-actuator of the invention includes a support frame having a base, a moving plate, a leading beam to connect the base with the moving plate; and two slider holding arms extending from both sides of the moving plate; at least one piezoelectric element bonding to the support frame to connect a free end of the base with the moving plate; wherein the moving plate sways in a first direction or in a second direction when the at least one piezoelectric element is actuated. The invention also discloses a head gimbal assembly and a disk drive unit using the micro-actuator.

5 Claims, 9 Drawing Sheets

U.S. PATENT DOCUMENTS

| | | |
|---|---|---|
| 2003/0168935 A1 | 9/2003 | Ogawa et al. |
| 2004/0085679 A1* | 5/2004 | Yao et al. .................. 360/294.4 |
| 2004/0136117 A1* | 7/2004 | Kuwajima et al. ....... 360/294.4 |
| 2005/0195531 A1* | 9/2005 | Yamazaki et al. ........ 360/294.4 |
| 2006/0023338 A1 | 2/2006 | Sharma et al. |
| 2006/0050442 A1 | 3/2006 | Yao et al. |
| 2006/0072247 A1 | 4/2006 | Yao et al. |
| 2006/0082917 A1 | 4/2006 | Yao et al. |
| 2006/0098347 A1 | 5/2006 | Yao et al. |
| 2006/0146449 A1 | 7/2006 | Yao et al. |

FOREIGN PATENT DOCUMENTS

| | | |
|---|---|---|
| JP | 2002-133803 | 5/2002 |

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

* cited by examiner

SWAY-TYPE MICRO-ACTUATOR WITH SLIDER HOLDING ARMS FOR A DISK DRIVE HEAD GIMBAL ASSEMBLY

FIELD OF THE INVENTION

The present invention relates to a disk drive unit, and more particularly to a micro-actuator and a head gimbal assembly (HAG) with such an micro-actuator.

BACKGROUND OF THE INVENTION

Disk drives are information storage devices that use magnetic media to store data. A traditional disk drive includes a magnetic disk and a drive arm for driving a HAG with a slider mounted thereon. The disk is mounted on a spindle motor which causes the disk to spin. A primary actuation, such as voice-coil motor (VCM) is provided for controlling the motion of the drive arm and, in turn, controlling the slider to move from track to track across the surface of the disk, thereby enabling the slider to read data from or write data to the disk. In operation, a lift force is generated by the aerodynamic interaction between the slider and the spinning magnetic disk. The lift force is opposed by equal and opposite spring forces applied by the suspension of the HAG such that a predetermined flying height above the surface of the spinning disk is maintained over a full radial stroke of the drive arm.

However, Because of the inherent tolerance (dynamic play) resulting from VCM that exists in the placement of the slider, the slider cannot achieve quick and fine position control which adversely impacts the ability of the slider to accurately read data from and write data to the disk. As a result, a secondary actuation so called dual stage micro-actuator is provided in the HAG in order to improve positional control of the slider.

FIG. 1a illustrates a traditional HAG 277 of a conventional disk drive with such a dual stage micro-actuator 205. The dual stage micro-actuator 205 corrects the displacement of a slider 203 on a much smaller scale, as compared to the VCM, in order to compensate for the resonance tolerance of the VCM and the HAG. The micro-actuator 205 enables, for example, the use of a smaller recording track pitch, and can increase the "tracks-per-inch" (TPI) value by 50% for the disk drive unit, as well as provide an advantageous quickly seeking and/or settle action for HDD and reduction in the head seeking and settling time. Thus, the micro-actuator 205 enables the disk drive device to have a significant increase in the surface recording density of the information storage disks used therein.

Referring to FIGS. 1a and 1b, the micro-actuator 205 has a ceramic U-shaped frame 297 that comprises two ceramic beams 207 with two PZT pieces (not labeled) on each side thereof. The micro-actuator 205 is physically coupling to a suspension 213, and there are three electrical connection balls 209 (gold ball bonding or solder bump bonding, GBB or SBB) to couple the micro-actuator 205 to the suspension traces 210 in one side of the ceramic beam 207. In addition, there are four balls 208 (GBB or SBB) to couple the slider 203 to the suspension 213 in the slider training edge for electrical connection. FIG. 2 shows a detailed process of inserting the slider 203 into the micro-actuator 205. The slider 203 is bonded with the two ceramic beams 207 at two points 206 by epoxy dots 212 so as to make the motion of the slider 203 independent of the drive arm.

When power supply is applied through the suspension traces 210, the PZT micro-actuator 205 can expand or contract to cause the U-shaped frame 297 deform and then make the slider 203 move along a radial direction on the disk 101. Thus a position fine adjustment can be attained.

However, the HAG 277 with the micro-actuator 205 is very difficult to manufacture. At first, inserting and bonding the slider 203 to the micro-actuator 205 is difficult. Secondly, the epoxy dot 212 is very difficult to control, that is, the length and height of the epoxy dot 212 must be controlled in a suitable range for ensuring a good working performance of the HAG 277.

Additionally, the micro-actuator 105 has an additional mass (the U-shaped frame 297), which not only influence the static performance, but also influence the dynamic performance of the suspension 213, such as the resonance performance, so as to reduce resonance frequency and increase the gain of the suspension 213.

Also, because the U-shaped frame 297 of the micro-actuator 205 are very brittle so as to produce a not perfect shock performance. In addition, it is also a other problem that no effective solution to identify the potential micro crack of the U-shaped frame 297. Furthermore, during the voltage applied to the PZT micro-actuator or normal operation, the back and forth bending of the brittle micro-actuator 205 may probably generate the particle and then influence the work performance of the micro-actuator 205.

In the manufacture process of HAG 277, since the HAG 277 has a complex configuration, the slider 203 must tilt during bonding the slider 203 to the U-shaped frame 297, and the U-shaped frame 297 must tilt during bonding the U-shaped frame 297 with the slider 203 to the suspension 213. Both will influence the static attitude of the HAG 277 and accordingly increase the difficulty of manufacturing the HAG 277.

It is well known that polishing is a more effective and widely used cleaning method for the micro contamination in the air bearing surface (ABS) of the slider. However, this cleaning method cannot be used in the above-mentioned HAG 277 because there is a potential danger to damage the U-shaped frame 297 of the micro-actuator 205.

At last, since the slider 203 is supported by the ceramic U-shaped frame 297, it is difficult to ground the slider 203 and suspension to get an electro static discharge (ESD) protection.

Hence it is desired to provide a micro-actuator, head gimbal assembly, disk drive which can overcome the foregoing drawbacks of the related art.

SUMMARY OF THE INVENTION

A main feature of the present invention is to provide a micro-actuator which can prevent from the slider from unduly movement and attain a fine head position adjustment.

A main feature of the present invention is to provide a HAG and a disk drive unit which having a more reliable electrical connection between its micro-actuator with its suspension.

To achieve the above-mentioned feature, a micro-actuator comprises a support frame having a base, a moving plate, a leading beam to connect the base with the moving plate; and two slider holding arms extending from both sides of the moving plate; at least one piezoelectric element bonding to the support frame to connect a free end of the base with the moving plate; wherein the moving plate sways in a first direction or in a second direction when the at least one piezoelectric element is actuated. In the invention, the two slider holding arms are substantially perpendicular to the moving plate.

A HAG of the invention comprises a slider; a micro-actuator; wherein the micro-actuator comprising a support frame and at least one piezoelectric element each of which has at least one piezoelectric element electrical pad; a suspension to support the slider and the micro-actuator; wherein at least one suspension electrical pad is provided on the suspension corresponding to the at least one piezoelectric element electrical pad; and a conductive film provided between the suspension electrical pad and the piezoelectric element electrical pad for establishing an electrical connection therebetween; wherein at least one conductive medium is provided on each suspension electrical pad to assist the electrical connection between the conductive film and each suspension electrical pad. According to an embodiment of the invention, the support frame comprises a base, a moving plate, a leading beam to connect the base with the moving plate; and two slider holding arms extending from both sides of the moving plate; the at least one piezoelectric element bonding to the support frame to connect a free end of the base with the moving plate; wherein the moving plate sways in a first direction or in a second direction when the at least one piezoelectric element is actuated. In a further embodiment, the conductive film is anisotropic conductive film; and the conductive medium is metal ball. The two slider holding arms are substantially perpendicular to the moving plate. In the invention, the slider can be partially bonded to the moving plate or the slider holding arms of the support frame.

A disk drive unit of the present invention comprises a HAG; a drive arm to connect with the HAG; a disk; and a spindle motor to spin the disk; wherein the HAG comprises a slider; a micro-actuator; and a suspension to support the slider and the micro-actuator. The micro-actuator comprises a support frame and at least one piezoelectric element each of which has at least one piezoelectric element electrical pad. At least one suspension electrical pad is provided on the suspension corresponding to the at least one piezoelectric element electrical pad; and a conductive film provided between the suspension electrical pad and the piezoelectric element electrical pad for establishing an electrical connection therebetween; wherein at least one conductive medium is provided on each suspension electrical pad to assist the electrical connection between the conductive film and each suspension electrical pad. According to an embodiment, the support frame comprises a base, a moving plate, a leading beam to connect the base with the moving plate; and two slider holding arms extending from both sides of the moving plate; the at least one piezoelectric element bonding to the support frame to connect a free end of the base with the moving plate; wherein the moving plate sways in a first direction or in a second direction when the at least one piezoelectric element is actuated.

Compared with the prior art, because the micro-actuator comprises a support frame with two slider holding arms, the two slider holding arms can define the position of the slider so as to prevent the slider from unduly movement and thus attain a more accurate head position adjustment. In addition, the present invention also provides a conductive medium on each suspension electrical pad to assist the electrical connection between the conductive film and each suspension electrical pad. The conductive medium can compensate an adherent gap formed on each suspension electrical pad so as to assure a reliable electrical connection between the conductive film and the suspension electrical pad. Thus a more reliable electriall connection between the micro-actuator with the HAG suspension is attained.

In addition, due to the simple structure of the support frame, the micro-actuator of the present invention omits an additional mass in related art so as to attain a good static and dynamic performance. Firstly, the micro-actuator of the present invention provide a new design of the support base made of metal, using the metal support base will greatly improve the shock performance of the micro-actuator and solve the problem of generating the particles compare with the traditional ceramic U-shaped frame.

Due to the complex manufacture process, it is difficult to control the static attitude in the prior art, the present invention can provide the similar manufacture process as the traditional HAG manufacture method but it is much better for the HAG static attitude control or use the traditional method to control it.

The invention is also better for the particle contamination control in the manufacture process. In addition, the traditional polishing cleaning method can be used for cleaning process in the present invention. Furthermore, because the ACF bonding is used for the slider mounting, it is make the grounding process much easier and the ACF is easy to do the salvage and recycle. At last, the present invention also can reduce the voltage of operating the thin film PZT micro-actuator and achieve the same displacement as the prior micro-actuator.

For the purpose of making the invention easier to understand, several particular embodiments thereof will now be described with reference to the appended drawings in which:

DESCRIPTION OF THE DRAWINGS

FIG. 1b is an enlarged, partial view of FIG. 1a;

FIG. 2 shows a detailed process of inserting a slider to a micro-actuator of the HAG of FIG. 1a;

DETAILED DESCRIPTION OF THE INVENTION

Various preferred embodiments of the present invention will now be described with reference to the figures. As indicated above, the present invention is designed to provide a micro-actuator with improved structure for the purpose of fine tuning the position of the slider. The improved micro-actuator comprises a support frame with two slider holding arms, the two slider holding arms can define the position of the slider so as to prevent the slider from unduly movement and thus attain a more accurate head position adjustment. In addition, the present invention also provides a new method to electrically bond the micro-actuator with a HAG suspension. The bonding methods will attain a more reliable electrical connection between the micro-actuator with the HAG suspension. Several example embodiments of the invention will now be described. It is noted that the invention is not limited to such implementations. Instead, the micro-actuator of the invention can be implemented in any suitable disk drive unit, regardless of the specific structure of the HAG.

Figure 1A:
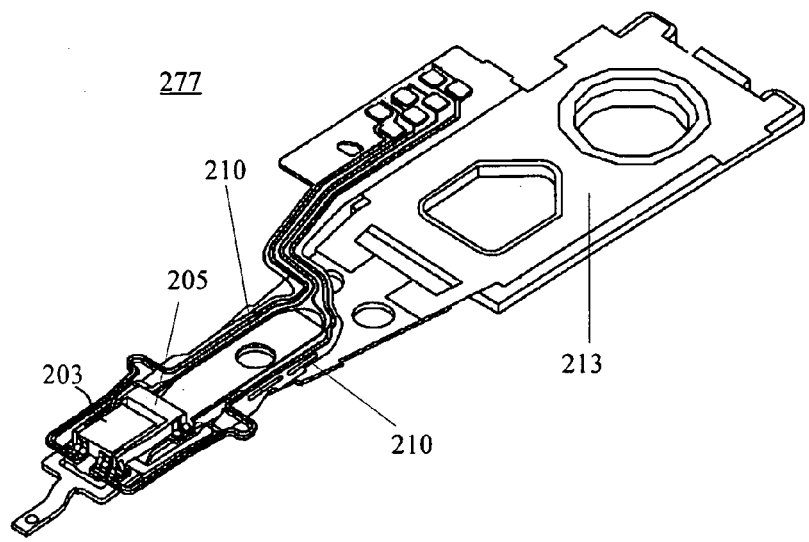
FIG. 1a is a perspective view of a HAG of prior art.
Figure 1B:
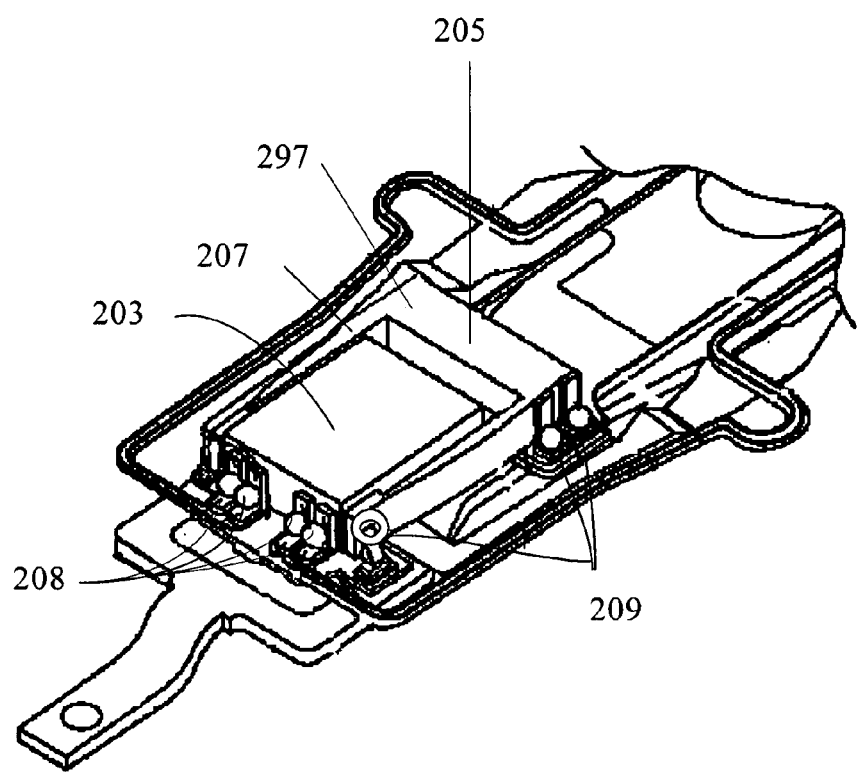
Figure 2:
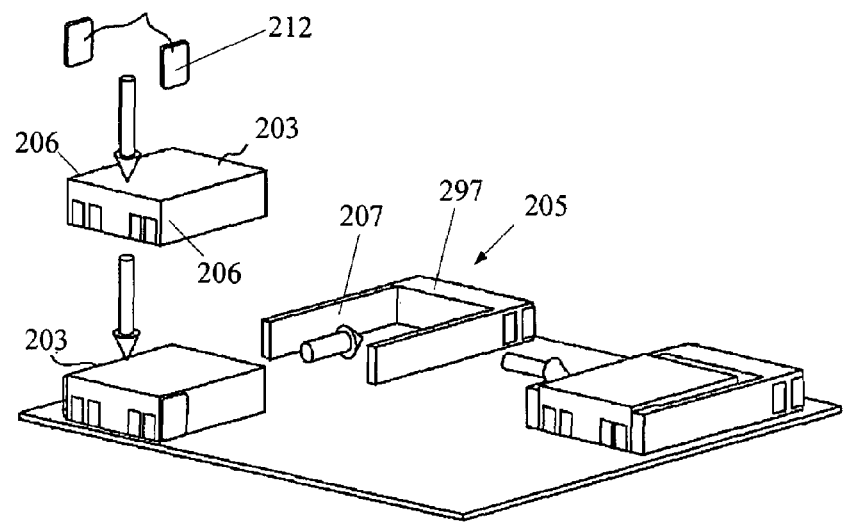
Figure 3:
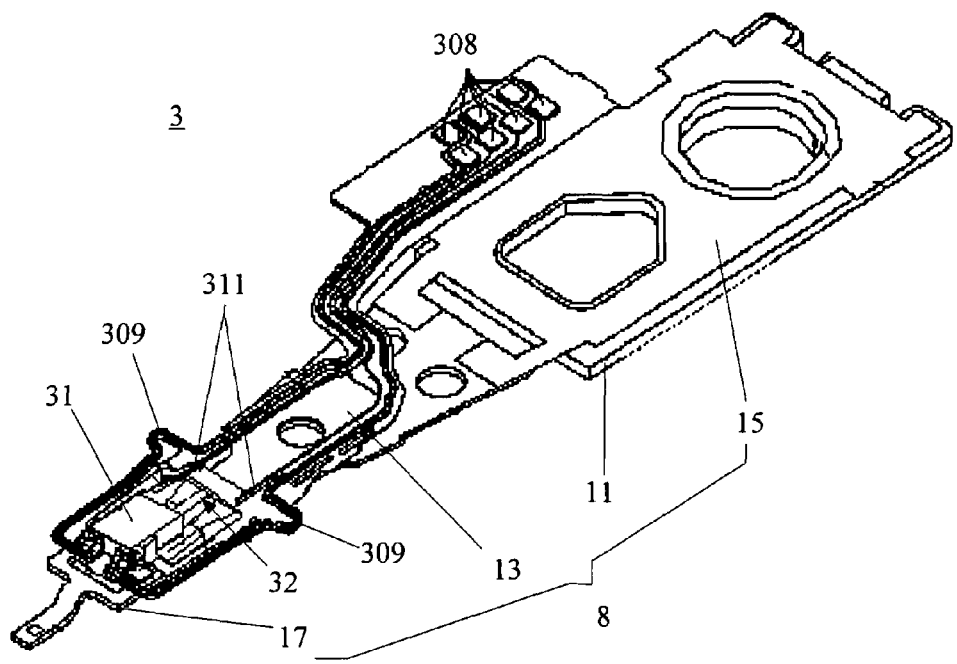
FIG. 3 is a perspective view of a HAG according to an embodiment of the present invention.
Figure 4:
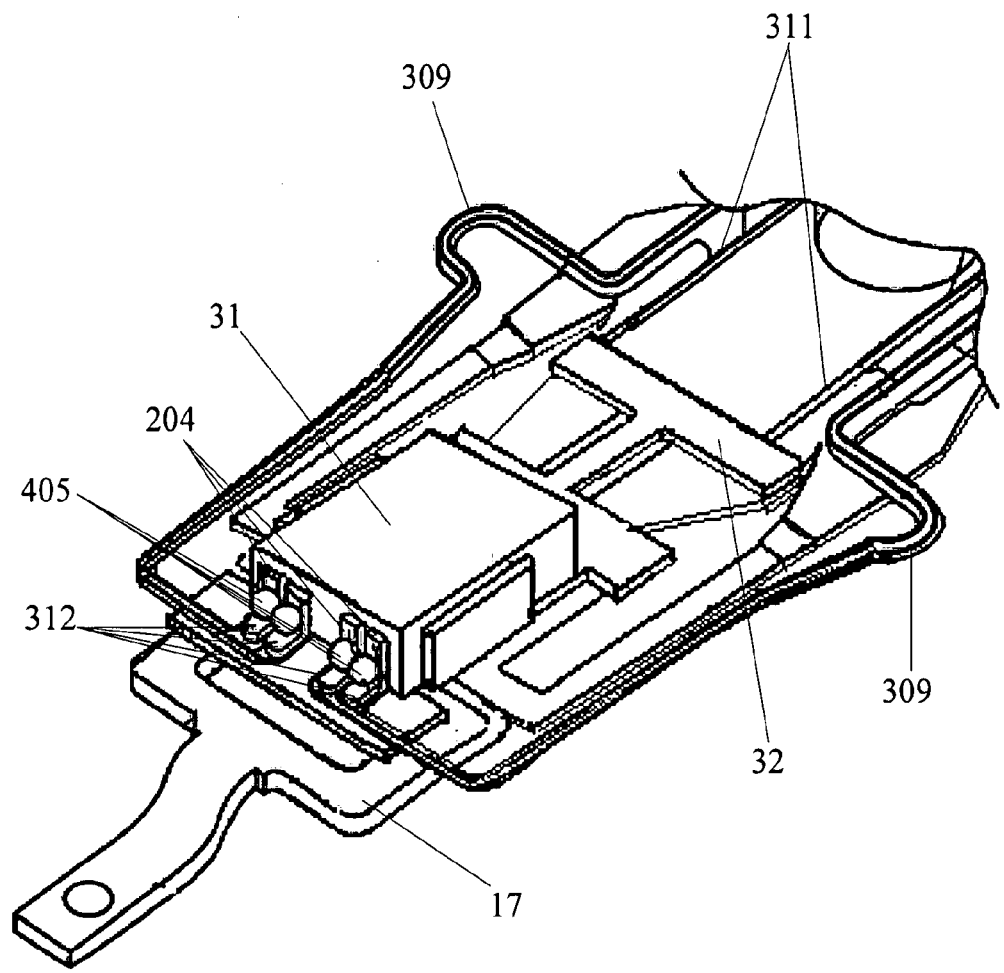
FIG. 4 is an enlarged, partial view of FIG. 3.
Figure 6:
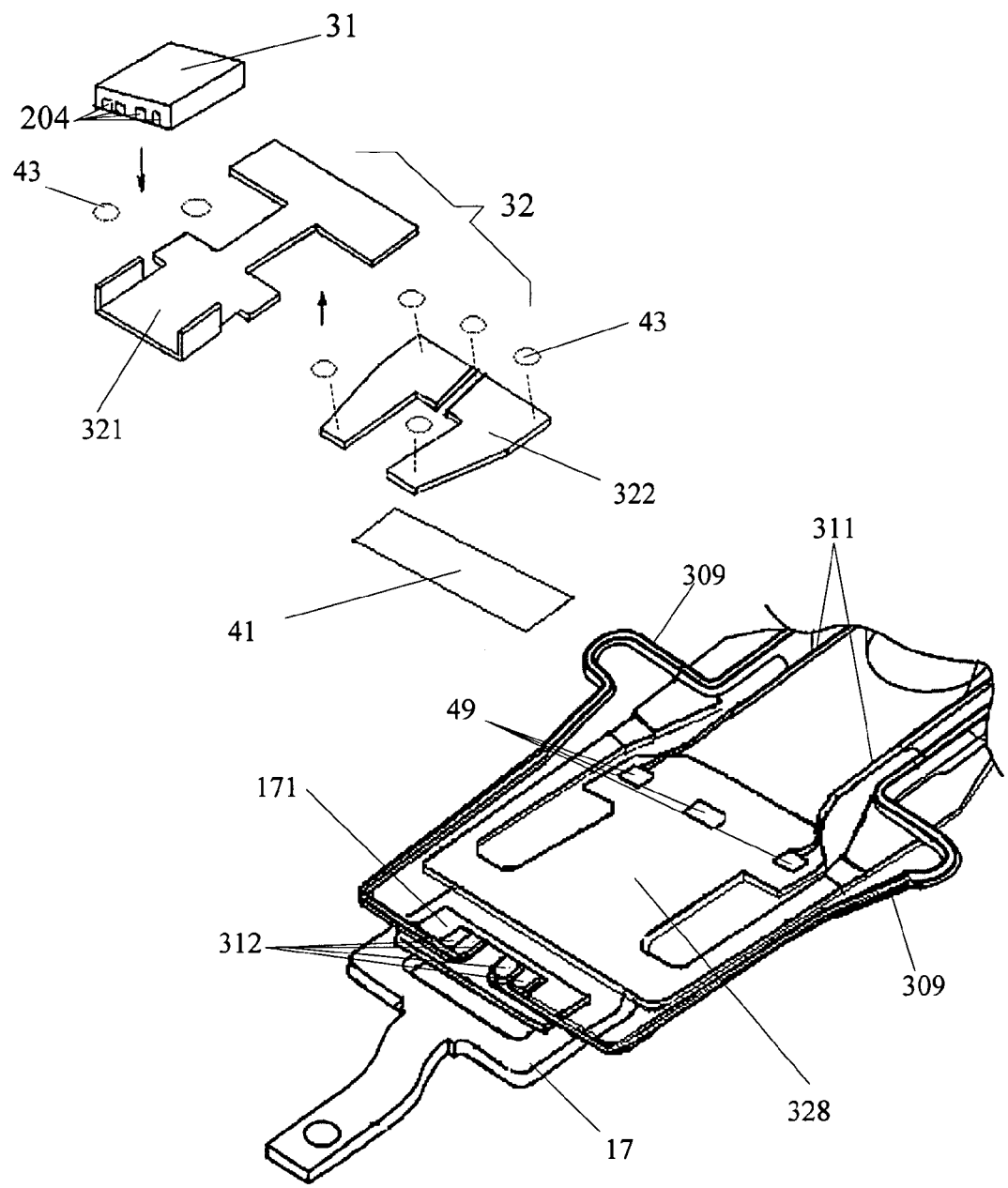
FIG. 6 is an exploded, perspective view of FIG. 4.

Referring to FIG. 3, a head gimbal assembly (HAG) 3 according to an embodiment of the invention comprises a slider 31, a micro-actuator 32 and a suspension 8. Referring to FIG. 6, the micro-actuator 32 comprises a support frame 321 and a piezoelectric (PZT) unit 322 which are partially bonded together by adhesive or epoxy dots 43. Referring to FIG. 4, the slider 31 has a plurality of electrical pads 204 thereon, which is partially bonded to the support frame 321 by adhesive or epoxy dots 43 so that the slider 31 can keep moving together with the micro-actuator 32.

Figure 5:
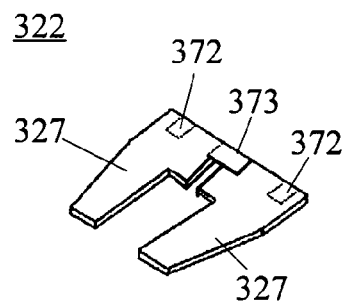
FIG. 5 is a perspective view of a PZT unit of the HAG of FIG. 3.
Figure 7:
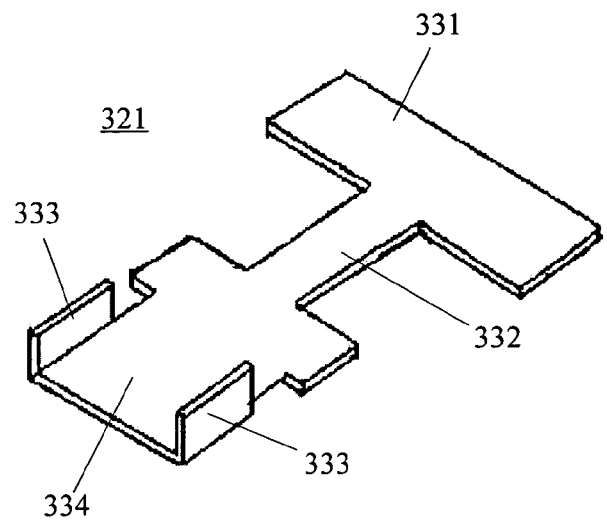
FIG. 7 is a perspective view of a support frame of the HAG of FIG. 3 according to an embodiment of the invention.

According to an embodiment of the invention, referring to FIG. 7, the support frame 321 comprises a base 331, a moving plate 334, a leading beam 332 to connect with the base 331 and the moving plate 334, and two slider holding arms 333 extending from both sides of the moving plate 334. In an embodiment of the invention, the width of the leading beam 332 is narrower than that of the moving plate 334 and the base 331. In an embodiment of the invention, as shown in FIG. 6, the slider 31 is partially bonded to the moving plate 334 by two expoxy dots 43. Selectively, the slider 31 can also be partially bonded to the slider holding arms 333 by epoxy dots 43. Understandably, the amount and the position of the epoxy dots 43 is not limited to the example shown in FIG. 6, it can be changed according to actual requirement. In the present invention, the support frame 321 is perferably made of metal material, such as stainless steel. Referring to FIG. 5, the PZT unit 322 comprises two independent PZT elements 327 which are connected with each other by an insulated common part (not labeled). Three electrical pads 372, 373 are provided on one side of the PZT elements 327. Here, the middle electrical pad 373 is a ground pad shared by the two PZT elements 327; the two electrical pads 372 are served as input electrical pads.

Figure 8:
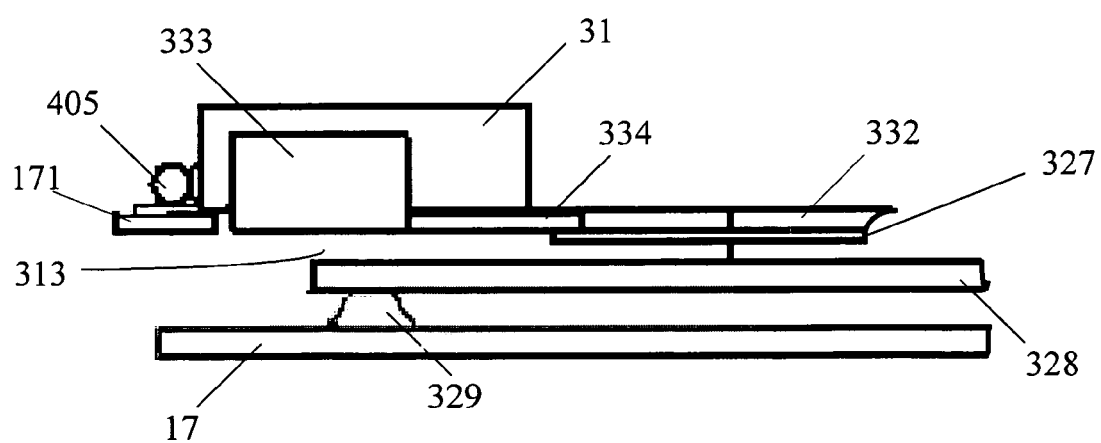
FIG. 8 is a cross-sectional view of the HAG of FIG. 3 in the micro-actuator area.
Figure 9:
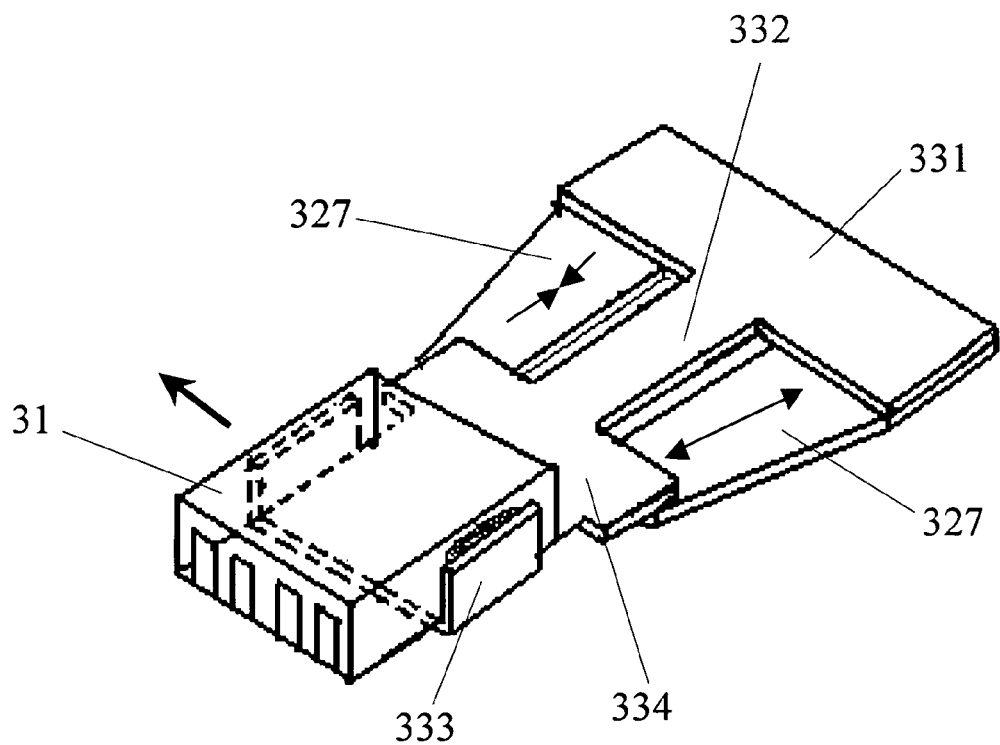
FIGS. 9-10 show two different operation methods of the micro-actuator.

Referring to FIG. 3, the suspension 8 comprises a load beam 17, a flexure 13, a hinge 15 and a base plate 11. The load beam 17 has a dimple 329 (see FIG. 8) formed thereon. In the hinge 15 and the base plate 11 there formed two holes (not labeled), one of which is used for swaging the HAG 3 and the drive arm (not shown); the other is used to reduce the weight of the suspension 8. On the flexure 13 a plurality of connection pads 308 are provided to connect with a control system (not shown) at one end and a plurality of electric multi-traces 309, 311 in the other end. Referring to FIGS. 6 and 8, the flexure 13 also comprises a suspension tongue 328 which are used to support the micro-actuator 32 and keep the loading force always being applied to the center area of the slider 31 through the dimples 329 of the load beam 17. Referring to FIGS. 5 and 6, a plurality of electrical pads 312 and 49 are provided on the suspension tongue 328 corresponding to the electrical pads 204 of the slider 31 and the electrical pads 372, 373 of the PZT elements 327. In fact, the electrical pads 312 are provided on a moving part 171 of the suspension 8 to connect with the electric multi-traces 309. The electrical pads 49 are connected with the electric multi-traces 311.

In the present invention, referring to FIGS. 4-6, a piece of anisotropic conductive film (ACF) 41 is provided between the micro-actuator 32 and the suspension tongue 328 to electrically connect the electrical pads 372, 373 of the PZT elements 327 with the electrical pads 49 of the suspension tongue 328, thus an electrical connection between the micro-actuator 32 and the control system by the electric multi-traces 311 is established. At the same time, referring to FIGS. 4, 6 and 8, the micro-actuator 32 are also physically coupled with the suspension tongue 328 of the flexure 13 by the ACF 41. Thus a parallel gap 313 is formed between the micro-actuator 32 and the suspension tongue 328 so as to ensure a smooth movement of the micro-actuator 32. In the present invention, the length of the parallel gap 313 is preferably 35~50 μm. In addition, a plurality of metal balls 405 (GBB or SBB) are used to electrically connect the electrical pads 204 of the slider 31 with the electrical pads 312 of the moving part 171 so as to establish an electrical connection between the slider 31 and the control system by the electric multi-traces 309.

Figure 6A:
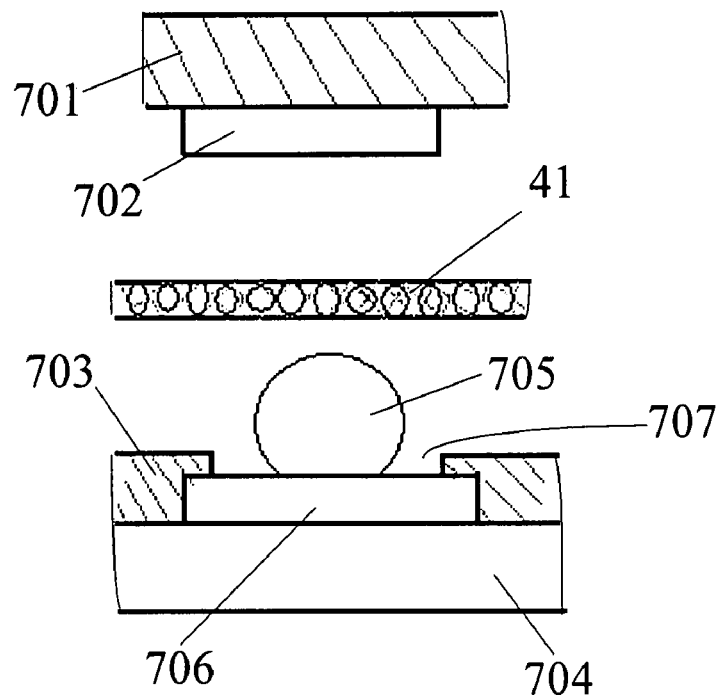
FIGS. 6a and 6b show a bonding process of the PZT unit with a suspension of the HAG of FIG. 3.
Figure 6B:
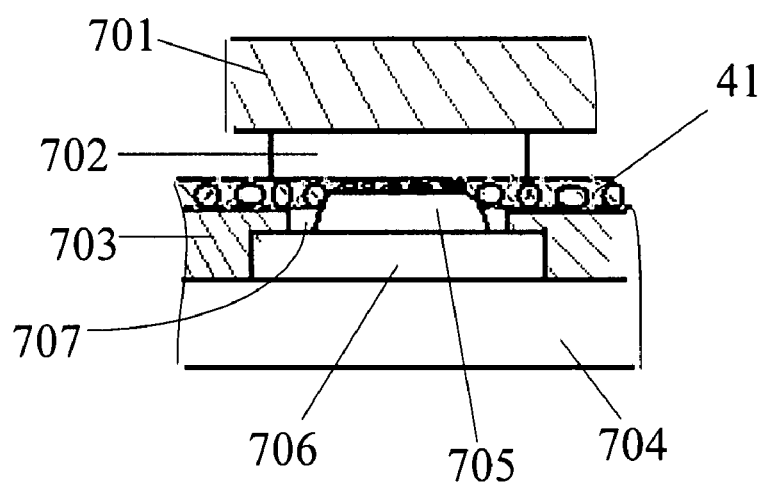

FIGS. 6a and 6b show a detailed ACF bonding process of the invention. The PZT electrical pad 372 comprises a substrate layer 701 and a bonding pad 702 on the substrate layer 701. Each of the electrical pads 49 of the suspension tongue 328 comprises a substrate layer 704, a bonding pad 706 on the substrate layer 704, and a cover layer 703 on the substrate layer 704 to cover the circumference of the bonding pad 706. Normally, when the ACF 41 is positioned on the electrical pad 49, a gap 707 will be formed between the bonding pad 706 and the ACF 41. The gap 707 may cause the PZT electrical pad 372 not to connect with the electrical pad 49. To avoid the above-mentioned case, at least one conductive block 705, such as metal ball, is positioned on the bonding pad 706 before the ACF 41 is positioned on the electrical pad 49. When the ACF 41 is positioned on the electrical pad 49, the conductive block 705 acts as a conductor to connect the ACF 41 with the bonding pad 706 regardless of the existance of the gap 707, thus a reliable electrical connection between the PZT electrical pad 372 and the electrical pad 49 of the suspension tongue 328 is established.

During assembly of the HAG 3, according to an embodiment of the invention, referring to FIG. 6, firstly, bonding the PZT unit 322 to one side of the support frame 321 to form a micro-actuator 32; then, the slider 31 is attached to the other side of the support frame 321 with the two slider holding arms 333 to firmly hold the slider 31. After that, a piece of ACF 41 is disposed on the suspension tongue 328 of the supension 8 to cover the electrical pads 49, and then the micro-actuator 32 with the slider 31 is mounted on the suspension tongue 328 by the ACF 41. Subsequently, a plurality of metal balls 405 (GBB or SBB) are used to electrically connect the electrical pads 204 of the slider 31 with the electrical pads 312 of the moving part 171. Thus a HAG of the present invention is formed. At last, cleaning and inspecting the HAG. Obviously, the assembly of the HAG 3 can also be performed as follows: coupling the micro-actuator 32 to the suspension 8 firstly, and then mounting the slider 31 on the micro-actuator 32.

Figure 10:
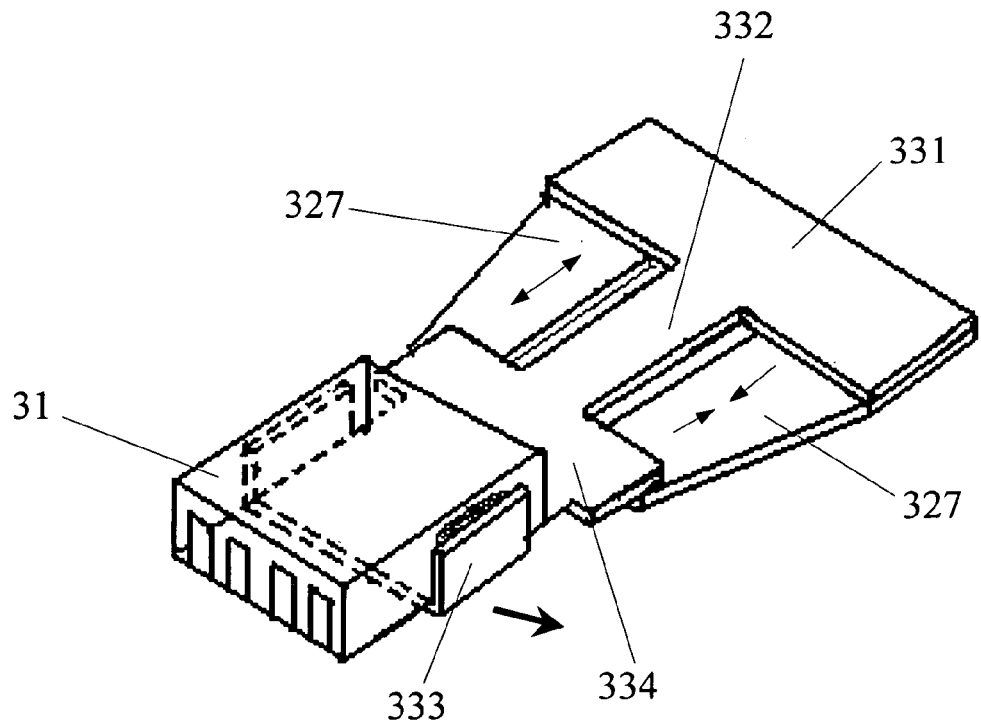
Figure 10A:
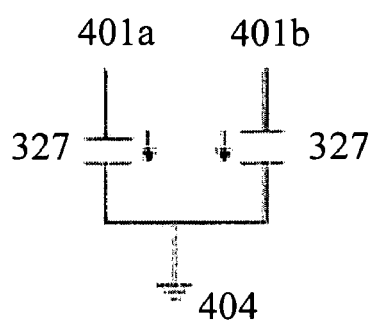
FIG. 10a shows an electrical connection relationship of two PZT elements of the micro-actuator of FIG. 9, which have a same polarization direction according to an embodiment of the present invention.

FIGS. 9, 10, 10a, 10c show a first operation method of the micro-actuator 32 for performing a position adjustment function. In the embodiment, the two PZT pieces 327 have a same polarization direction, as shown in FIG. 10a, which are common grounded by one end 404 and the other ends 401a and 401b thereof are applied two different voltages, one of which has a sine waveform 406, the other has a sine waveform 408 (see FIG. 10c). In the invention, when no voltage is applied to the PZT elements 327 of the micro-actuator 32, the micro-actuator 32 will stay its initial position. When the sine voltages with waveforms 406 and 408 are applied to the two PZT elements 327, in a first half period, one of the two PZT elements 327 will contract while the other PZT element 327 will expand with the drive voltage increasing, and then gradually spring back till to its original location with the drive voltage reducing. In the first half period, when the drive voltage increases, the moving plate 334 will be bent by the PZT elements 327 to left side; when the drive voltage reduces, the moving plate 334 will return back to its original positions. When the drive voltages go down to a second half period (having an opposed phase with the first half period), the moving plate 334 will be bent by the PZT elements 327 to right side; when the drive voltage reduces, the moving plate 334 will return back to its original positions. In the present invention, because the slider 31 is partially mounted on the moving plate 334, a head position adjustment is thus attained because the moving plate 334 is bent to and fro.

Figure 10B:
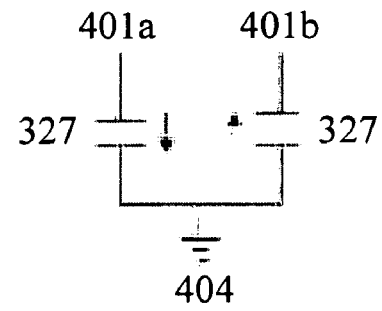
FIG. 10b shows an electrical connection relationship of two PZT elements of the micro-actuator of FIG. 9, which have opposing polarization directions according to another embodiment of the present invention.
Figure 10C:
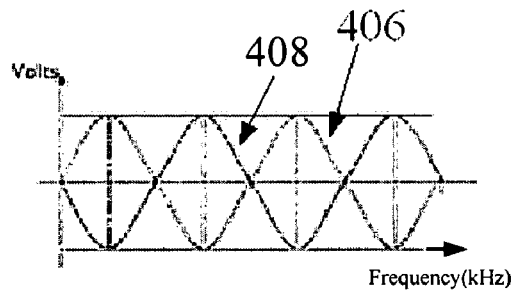
FIG. 10c shows two waveforms of voltages which are applied to the two PZT elements of FIG. 10a, respectively.
Figure 10D:
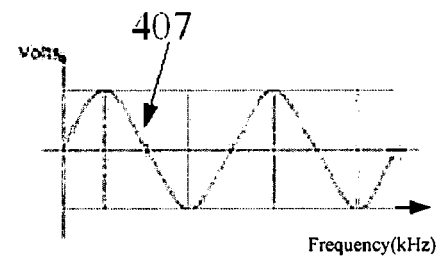
FIG. 10d shows a waveform of voltage which is applied to the two PZT elements of FIG. 10b, respectively.

FIGS. 9, 10, 10b, 10d show another operation method of the two PZT elements 327 for performing head position adjustment function. In the embodiment, the two PZT elements 327 have two opposing polarization directions, as shown in FIG. 10b, which are also common grounded by one end 404 and the other ends 401a and 401b thereof are applied two voltages with a same phase waveforms 407 (see FIG. 10d). Under the drive of the voltages, during a same half period, one of the PZT elements 327 will contract gradually and then back to its initial position while the other PZT elements 327 will expand gradually and then back to its initial position. when the voltages go to next half period, one of the PZT elements 327 will expand and then back to its initial position while the other will contract gradually and then back to its initial position. Similarly, the slider 31 is circularly swayed from left to right and then from right to left to attain a fine head position adjustment. In the present invention, the displacement of the slider 31 can be changed according to different input voltages. Also, different width of the leading beam 332 will result in a different slider displacement sensitivity.

Figure 11:
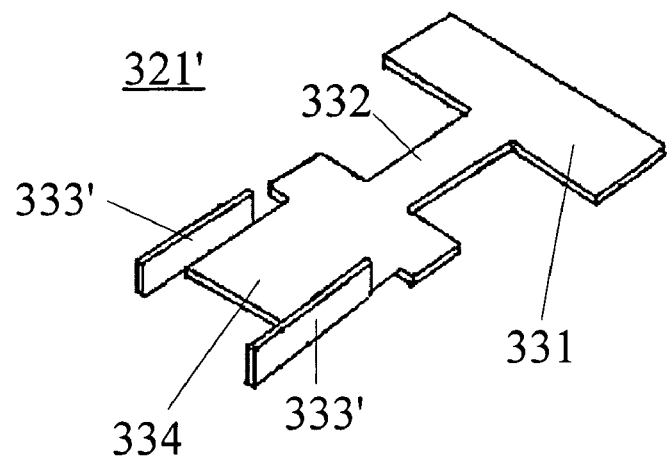
FIG. 11 is a perspective view of a support frame according to a second embodiment of the present invention.

According to another embodiment of the invention, as shown in FIG. 11, the support frame may has another kind of structure like a support frame 321'. The support frame 321' has two slider holding arms 333' extending from both sides of the moving plate 334. Each of the slider holding arms 333' comprises an elongated portion exceeding the free end of the moving plate 334 for coupling with the slider 31.

Figure 12:
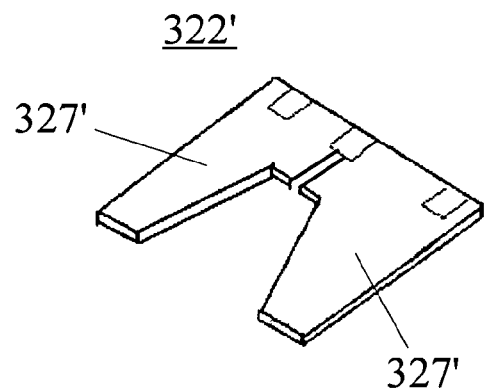
FIG. 12 is a perspective view of a PZT unit according to a further embodiment of the invention.

According to a further embodiment of the invention, referring to FIG. 12, the PZT unit may be has another shape like a PZT unit 322'. The PZT unit 322' comprises two PZT elements 327' which inner sides constitute a trapeziform opening. Obviously, the PZT unit may have other suitable shape according to different actual requirements.

In the present invention, the slider 31 can also be partially bonded to the slider holding arms 333 by adhesive or epoxy dots. The slider holding arms 333 sway together with the moving plate 334 when the PZT elements 327 are excited so as to attain a head position adjustment.

In the present invention, the slider 31 is partially, not fully bonded to the support frame 321 (the moving plate 334 or the slider holding arms 333) for the following reason: a curve of slider profile (both crown profile and camber profile) versus temperature is more stable than such a curve of the slider fully bonding to the support frame 321. The more stable curve of slider profile implys a more stable head flying performance which means good stability with the micro-actuator, in the case, the accurate head position adjustment capability can be attained.

Figure 13:
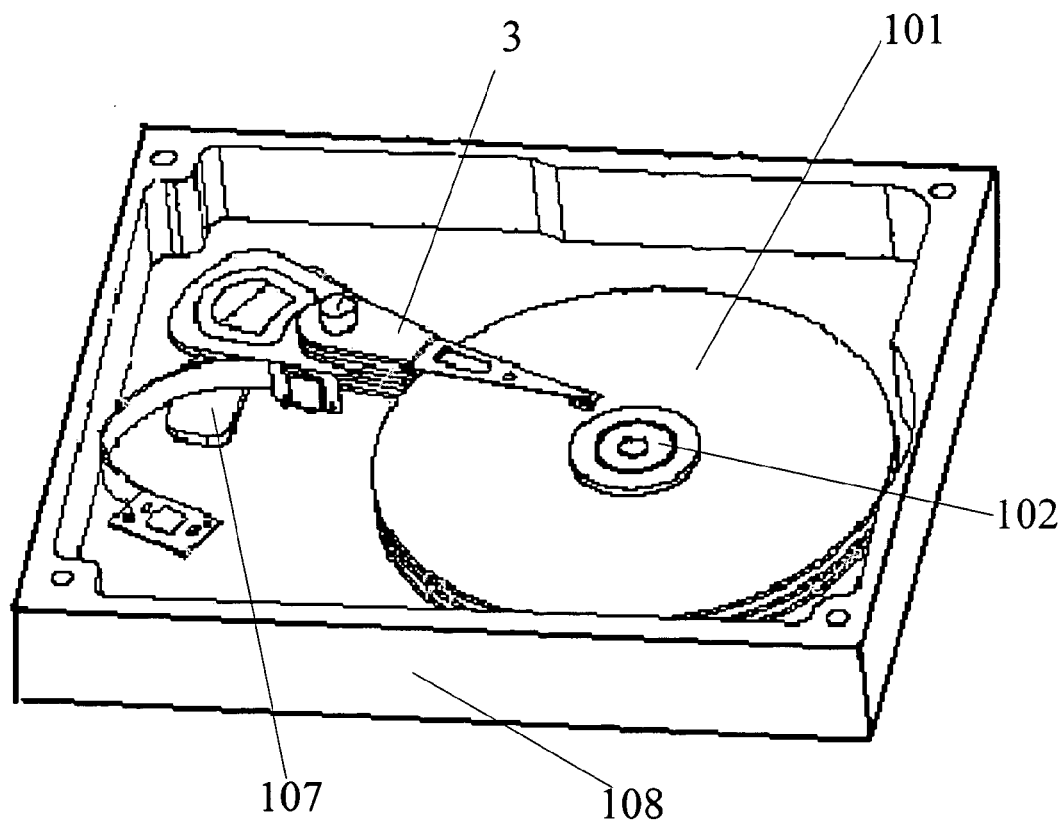
FIG. 13 is a perspective view of a disk drive unit according to an embodiment of the invention.

According to an embodiment of the invention, referring to FIG. 13, a disk drive unit can be attained by assembling a disk 101, a spindle motor 102, the HSA 3, a VCM 107 and a disk drive housing 108. Because the structure and/or assembly process of such a disk drive unit by using the HSA 3 of the present invention are well known to persons ordinarily skilled in the art, a detailed description of such structure and assembly is omitted herefrom.

What is claimed is:

1. A head gimbal assembly comprising:
    a slider;
    a micro-actuator comprising:
        a support frame and at least one piezoelectric element, each said piezoelectric element having at least one piezoelectric element electrical pad,
        wherein the support frame comprises a base, a moving plate, a leading beam to connect the base with the moving plate; and two slider holding arms configured to hold at least a part of the slider therebetween and extending from both sides of the moving plate,
        wherein the at least one piezoelectric element is bonded to the support frame to connect a free end of the base with the moving plate, and
        wherein the moving plate sways in a first direction or in a second direction when the at least one piezoelectric element is actuated;
    a suspension to support the slider and the micro-actuator; wherein at least one suspension electrical pad is provided on the suspension corresponding to the at least one piezoelectric element electrical pad; and
    a conductive film provided between the suspension electrical pad and the piezoelectric element electrical pad for establishing an electrical connection therebetween;
    wherein at least one conductive medium is provided on each suspension electrical pad to assist the electrical connection between the conductive film and each suspension electrical pad.

2. The head gimbal assembly as claimed in claim 1, wherein the conductive film is anisotropic conductive film; and the conductive medium is metal ball.

3. The head gimbal assembly as claimed in claim 1, wherein the two slider holding arms are substantially perpendicular to the moving plate.

4. The head gimbal assembly as claimed in claim 1, wherein the slider is partially bonded to the support frame.

5. A disk drive unit comprising:
    a head gimbal assembly;
    a drive arm to connect with the head gimbal assembly;
    a disk; and
    a spindle motor to spin the disk;
    wherein the head gimbal assembly comprises a slider and a micro-actuator,
    wherein the micro-actuator comprises a support frame and at least one piezoelectric element, each said piezoelectric element having at least one piezoelectric element electrical pad,
        wherein the support frame comprises a base, a moving plate, a leading beam to connect the base with the moving plate; and two slider holding arms configured to hold at least a part of the slider therebetween and extending from both sides of the moving plate, wherein the at least one piezoelectric element is bonded to the support frame to connect a free end of the base with the moving plate, and
wherein the moving plate sways in a first direction or in a second direction when the at least one piezoelectric element is actuated;
a suspension to support the slider and the micro-actuator;
wherein at least one suspension electrical pad is provided on the suspension corresponding to the at least one piezoelectric element electrical pad; and
a conductive film provided between the suspension electrical pad and the piezoelectric element electrical pad for establishing an electrical connection therebetween;
wherein at least one conductive medium is provided on each suspension electrical pad to assist the electrical connection between the conductive film and each suspension electrical pad.

* * * * *